United States Patent
Grochowski et al.

(10) Patent No.: US 7,380,111 B2
(45) Date of Patent: May 27, 2008

(54) OUT-OF-ORDER PROCESSING WITH PREDICATE PREDICTION AND VALIDATION WITH CORRECT RMW PARTIAL WRITE NEW PREDICATE REGISTER VALUES

(75) Inventors: Edward T. Grochowski, San Jose, CA (US); Jared W. Stark, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 303 days.

(21) Appl. No.: 10/888,052

(22) Filed: Jul. 8, 2004

(65) Prior Publication Data
US 2004/0243791 A1 Dec. 2, 2004

Related U.S. Application Data

(62) Division of application No. 10/038,036, filed on Jan. 2, 2002.

(51) Int. Cl.
*G06F 9/38* (2006.01)
(52) U.S. Cl. ...................... 712/239; 711/155
(58) Field of Classification Search ...................... None
See application file for complete search history.

(56) References Cited

U.S. PATENT DOCUMENTS

| | | | |
|---|---|---|---|
| 4,594,655 A | 6/1986 | Hao et al. | |
| 4,819,155 A | 4/1989 | Wulf et al. | |
| 5,051,940 A | 9/1991 | Vassiliadis et al. | |
| 5,214,763 A | 5/1993 | Blaner et al. | |
| 5,287,503 A * | 2/1994 | Narad | 710/220 |
| 5,437,043 A | 7/1995 | Fujii et al. | |
| 5,535,404 A | 7/1996 | Tsubota | |
| 5,546,597 A | 8/1996 | Martell et al. | |
| 5,655,135 A * | 8/1997 | Sholander et al. | 711/100 |
| 5,732,234 A | 3/1998 | Vassiliadis et al. | |
| 5,838,941 A | 11/1998 | Valentine et al. | |
| 5,859,999 A * | 1/1999 | Morris et al. | 712/224 |
| 5,937,178 A | 8/1999 | Bluhm | |
| 5,991,531 A | 11/1999 | Song et al. | 703/26 |

(Continued)

OTHER PUBLICATIONS

Jourdan et al., "A Novel Renaming Scheme to Exploit Value Temporal Locality Through Physical Register Reuse and Unification", IEEE 1998, p. 10.
S. Muchnick, "Forward Substitution", Advanced Complier Design and Implementaion, Copyright 1997 by Morgan Kaufmann Publisher, Section 13.1.3, p. 396, 3 pages, 1997.
Phillips et al., "High Performance 3-1 Interlock Collapsing ALU's", IEEE, 1194, p. 12.
Jacobson et al., "Instruction Pre-Processing in Trace Processors", 1999, 5 pages.

*Primary Examiner*—Kenneth S. Kim
(74) *Attorney, Agent, or Firm*—Blakely, Sokoloff, Taylor & Zafman LLP (57) ABSTRACT

A method for processing registers in an out-of-order processor. A predicate in an instruction is predicted. An architecturally correct value is then computed using a read-modify-write operation. The predicted value is compared to the architecturally correct value. The instruction with an incorrectly-predicted predicate is flushed from the pipeline if the predicted value and the architecturally correct value are different.

10 Claims, 5 Drawing Sheets

U.S. PATENT DOCUMENTS

| | | | |
|---|---|---|---|
| 5,996,032 A | 11/1999 | Baker | 710/62 |
| 6,353,883 B1* | 3/2002 | Grochowski et al. | 712/240 |
| 6,363,442 B1* | 3/2002 | Chapman | 710/62 |
| 6,367,004 B1* | 4/2002 | Grochowski et al. | 712/226 |
| 6,513,109 B1* | 1/2003 | Gschwind et al. | 712/200 |
| 6,654,878 B1 | 11/2003 | Swanberg et al. | |
| 6,757,814 B2* | 6/2004 | Kling et al. | 712/234 |
| 6,907,484 B2 | 6/2005 | Dwyer, III | |
| 2002/0087836 A1 | 7/2002 | Jourdan et al. | |
| 2002/0143967 A1 | 10/2002 | Derr | |

* cited by examiner

OUT-OF-ORDER PROCESSING WITH PREDICATE PREDICTION AND VALIDATION WITH CORRECT RMW PARTIAL WRITE NEW PREDICATE REGISTER VALUES

The present application in a Divisional of U.S. Patent Application entitled "PROCESSING PARTIAL REGISTER WRITES IN AN OUT-OF-ORDER PROCESSOR," filed on Jan. 2, 2002, Ser. No. 10/038,036, which is incorporated herein by reference.

BACKGROUND

Microprocessors often use instruction pipelining to increase instruction throughput. An instruction pipeline processes several instructions through different stages of instruction execution concurrently, using an assembly line-type approach. Furthermore, these instructions may be executed in a dynamically scheduled (e.g., out-of-order) processor.

In the Itanium Architecture, an instruction may include a "qualifying predicate". The value of the qualifying predicate determines whether the instruction is executed or not. Itanium Architecture uses 64 predicate registers.

The performance of out-of-order computers using predicate registers, may be degraded by dependencies. A dependency exists between two instructions if the execution of one depends upon the results of executing the other. Thus, each instruction has the potential to stall later instructions that depend on it. Therefore, in some applications, predicates may be predicted in advance to remove the dependencies. However, verifying predicate prediction and maintaining the architecturally correct predicate registers are often cumbersome and tedious process because each predicate register must be verified and maintained individually.

DETAILED DESCRIPTION

In recognition of the above-stated difficulties associated with verifying and maintaining architecturally correct values for the predicate registers, the present invention describes embodiments for effectively configuring the maintenance of values for the predicate register file. Specifically, the present embodiments provide techniques for verifying the validity of predicate prediction and maintaining architecturally correct predicates in the predicate register file. Consequently, for purposes of illustration and not for purposes of limitation, the exemplary embodiments of the invention are described in a manner consistent with such use, though clearly the invention is not so limited.

Embodiments of the present invention provide for processing of partial register writes in a dynamically scheduled (e.g., out-of-order) processor. In one embodiment, the processing is performed in accordance with the Itanium architecture definition. Furthermore, the registers may include predicate registers and/or Not-a-Thing (NaT) registers. The NaT register is used to assemble groups of NaT bits into a single 64-bit quantity for transfer to memory, and to disassemble a 64-bit quantity from memory into individual NaT bits.

However, there are two issues that need to be resolved the registers may be effectively processed in an out-of-order processor. The first issue involves handling dependencies between a producer instruction and a consumer instruction. The producer instruction writes to the registers (e.g., predicate registers), while the consumer instruction reads the contents of the registers. The second issue involves determining how to compute and maintain archetechturally correct values for the registers.

TABLE 1

| 011     | cmp.eq p3, p4 = r1, r2 |
|---------|------------------------|
| 012 (p4)| mov r10 = r11          |

Table 1 illustrates the first issue in which the instruction 012 is dependent on the instruction 011. In the illustrated example, the 'cmp.eq' instruction 011 is a producer of predicate registers, p3 and p4. Thus, this instruction 011 sets the predicate registers, p3 and p4, according to the result of the compare between registers, r1 and r2. Furthermore, the 'mov' instruction 012 is a consumer of the predicate register, p4. Thus, this instruction 012 is conditionally executed depending on the value of the predicate register, p4.

The above-described dependency may be handled with a variety of techniques. One technique is to apply a history-based branch prediction. This technique operates to construct a history or pattern table that relies on the past history of the branch to determine the prediction. The technique may be applied to the processor's front-end pipeline to predict the value of the predicate register p4, to remove the dependency between the two instructions 011, 012. Thus, in the above-illustrated example, the past history of the compare instruction 011 is used to predict the value of predicate registers p3 and p4 before the instruction 011 is executed. If the prediction results in the predicate p4 being assigned the value of TRUE, the instruction 012 may be speculatively executed concurrently with instruction 011. Otherwise, if the prediction results in the predicate p4 being assigned the value of FALSE, the instruction 012 is "no-op-ed" (i.e., not executed).

In the present embodiments, the predicted value is compared against the architecturally correct value subsequent to the speculative execution of instructions based on the history-based prediction of predicates. If the predicted value is different from the architectural value, the sequence is replayed to execute the desired instructions. However, qualifying predicates are the only dependencies removed by the history-based predictor. Thus, the 'mov-from-pr' instruction reads the architectural predicate register rather than using the predictor and is scheduled with an explicit dependency.

The second issue involves determining how to compute and provide architecturally correct values for the registers in an out-of-order processor, particularly, in accordance with the Itanium architecture definition.

In one embodiment, the architectural predicate values are used to verify the predicted value from the front-end, and to provide the source operand for 'move-from-pr' instruction. Table 2 shows different Itanium instructions that write to 1, 2, 48, or up to 63 predicate registers at once. Hence, Table 2 illustrates the need to update some bits of a register file while leaving other bits unchanged. This is sometimes referred to as the "partial writes" problem. However, executing the instructions in Table 2 at relatively low speeds, such as by flushing the processor's pipeline on each execution, may be undesirable and disadvantageous. Accordingly, instructions are executed from each class at relatively high speed (e.g., one instruction per clock cycle) to achieve reasonable performance.

TABLE 2

| Instructions that write 1 predicate | Instructions that write 2 predicates | Instruction that writes 48 predicates | Instruction that writes up to 63 predicates |
|---|---|---|---|
| br.ctop | cmp | mov pr.rot | mov pr |
| br.cexit | cmp4 | | |
| br.wtop | fclass | | |
| br.wexit | fcmp | | |
| bfprcpa | tbit | | |
| fprsqrta | tnat | | |
| frcpa | | | |
| frsqrta | | | |

Figure 1:
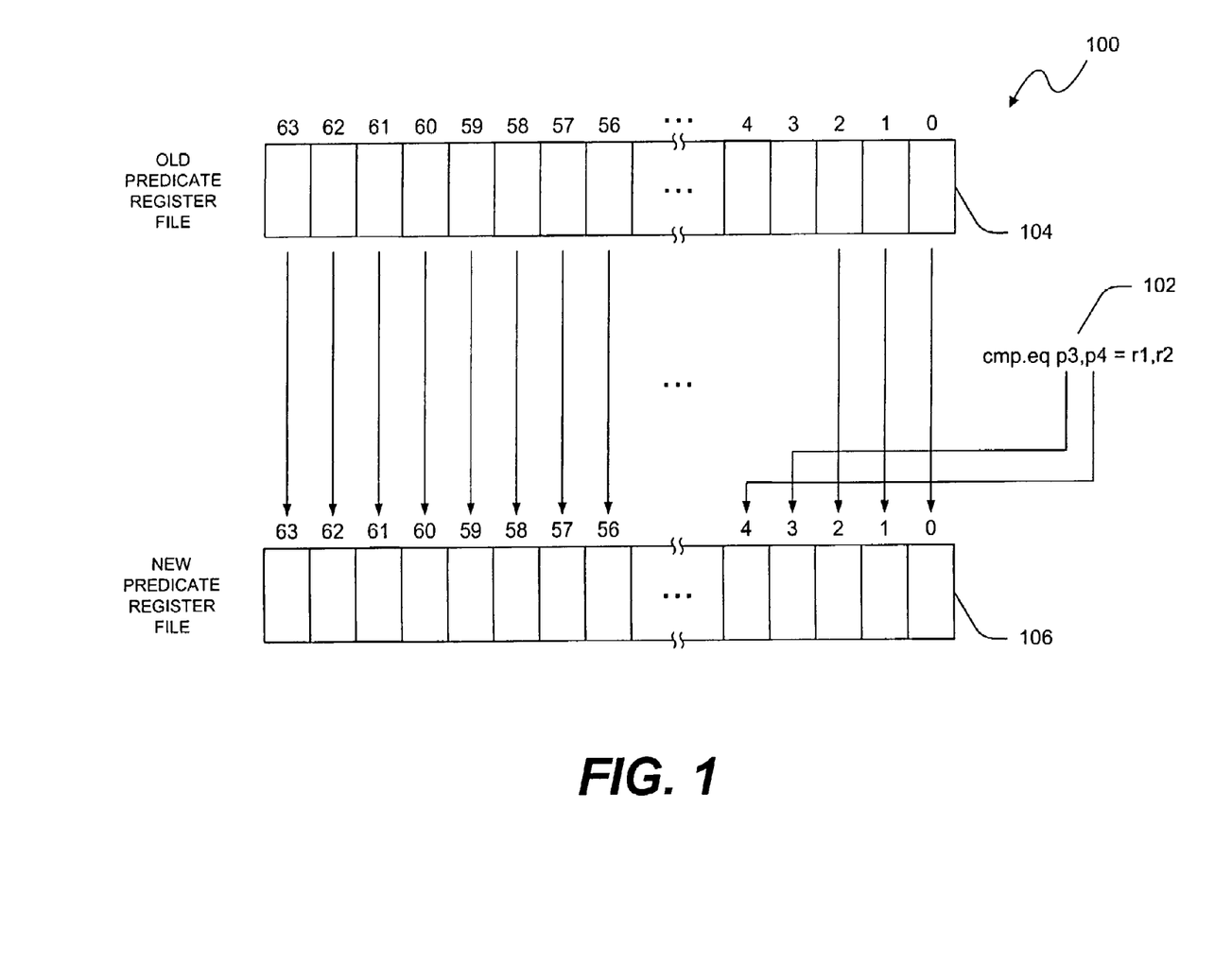
FIG. 1 illustrates a technique that provides a solution to a "partial writes" problem according to an embodiment of the present invention.

A technique 100 that provides a solution to the "partial writes" problem according to an embodiment of the present invention is illustrated in FIG. 1. In the illustrated embodiment, the technique 100 handles the problem by processing instructions that write to a predicate register file, having a plurality of predicate registers, as read-modify-write operations. Specifically, the technique 100 initially reads old values from the 64-bit predicate register file 104. This may involve substantially simultaneously reading the values of all 64 predicate registers in the old predicate register file 104. The value(s) of 1, 2, 48, or up to 63 predicate registers are then modified depending on the involved instruction, as listed in Table 2. For example, in FIG. 1, the involved instruction 102 is a 'cmp' instruction. This instruction, according to Table 2, writes 2 predicates, p3 and p4. Hence, only the values of the old predicate registers p3 and p4 are modified in this example. All 64 values, including the two that were modified, may then be written to a new 64-bit predicate register file 106 substantially simultaneously.

An out-of-order processor typically assigns a new physical register every time a register is written. Thus, multiple 'cmp' instructions, each being performed as a read-modify-write, write the results to different 64-bit physical registers. Accordingly, the old 64-bit predicate register and new 64-bit predicate register are not necessarily the same physical register.

Figure 2:
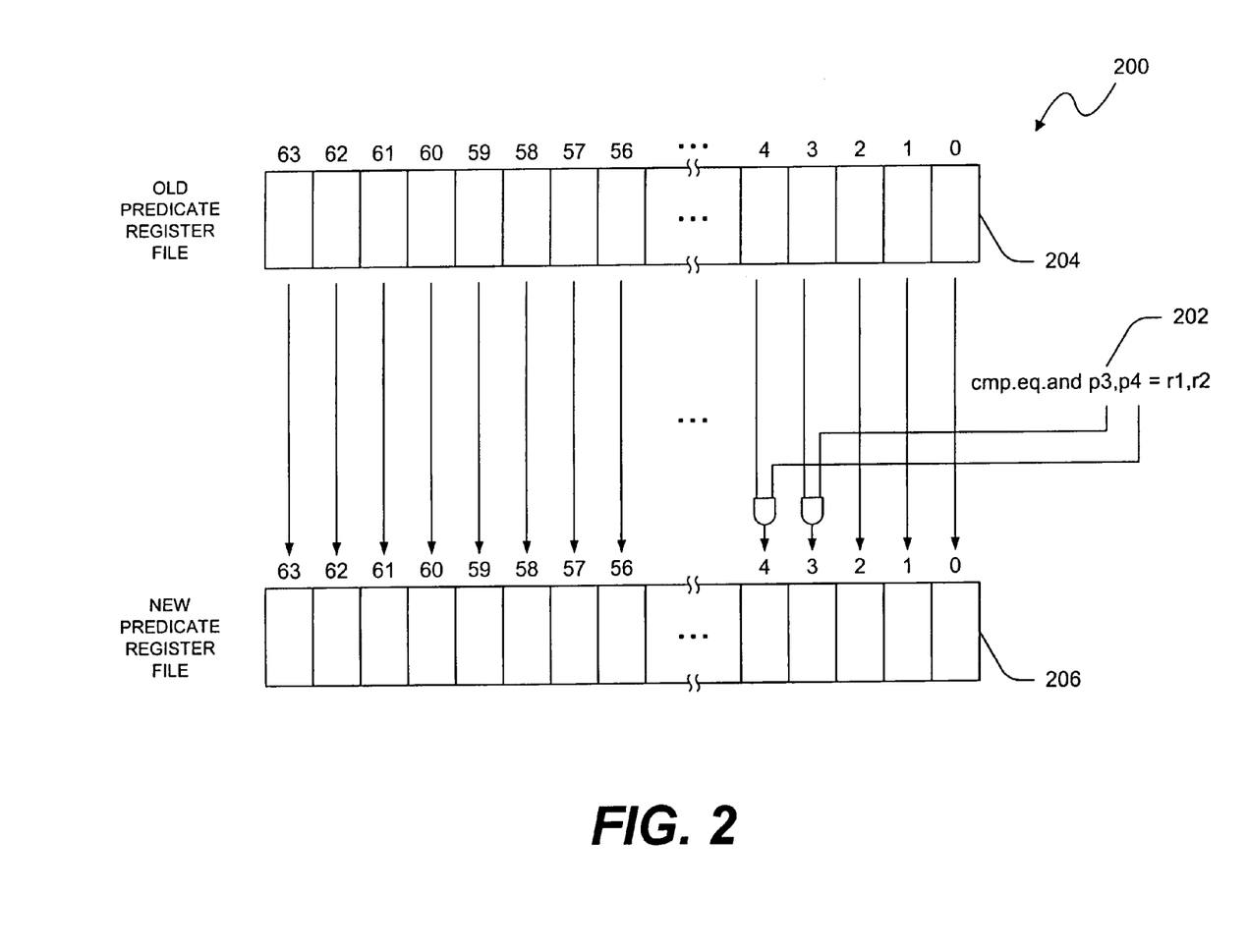
FIG. 2 illustrates a similar technique involved in processing parallel compares, such as a 'cmp.eq.and' instruction, according to another embodiment of the present invention.

FIG. 2 illustrates a similar technique 200 involved in processing parallel compares, such as a 'cmp.eq.and' instruction 202, according to another embodiment of the present invention. Again, the technique 200 initially reads old values from the 64-bit predicate register file 204. This may involve substantially simultaneously reading the values of all 64 predicate registers in the old predicate register file 204. However, in this example, the values of the predicate registers p3 and p4 are modified according to the results of parallel compare between the registers r1 and r2. Moreover, the values computed by the parallel compare are logically AND-ed with the old predicate values to give the new predicate values. All 64 values, including the two that were modified, may then be written to a new 64-bit predicate register file 206 substantially simultaneously.

Figure 3A:
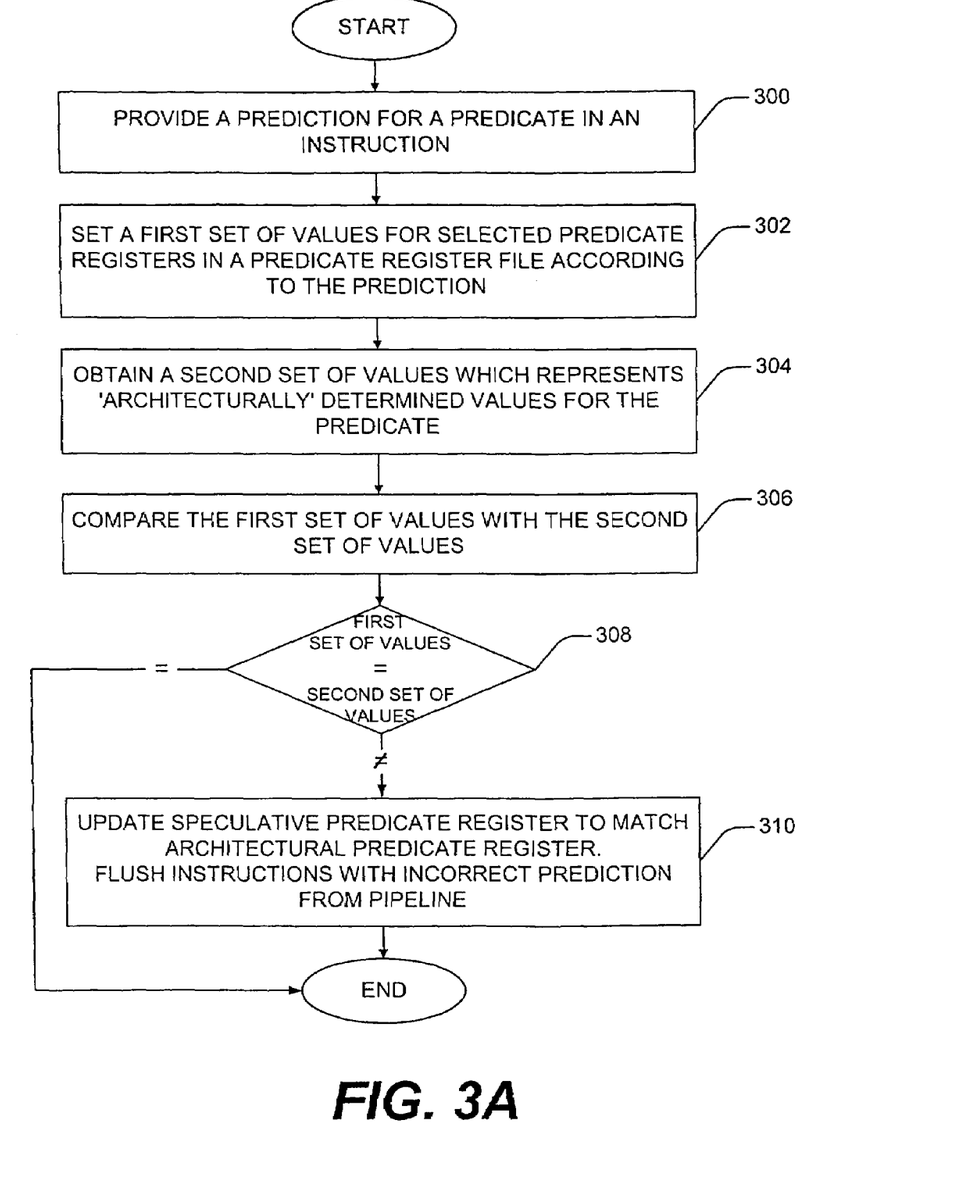
FIGS. 3A and 3B is a flowchart of a method for processing of registers in an out-of-order processor in accordance with an embodiment of the present invention.
Figure 3B:
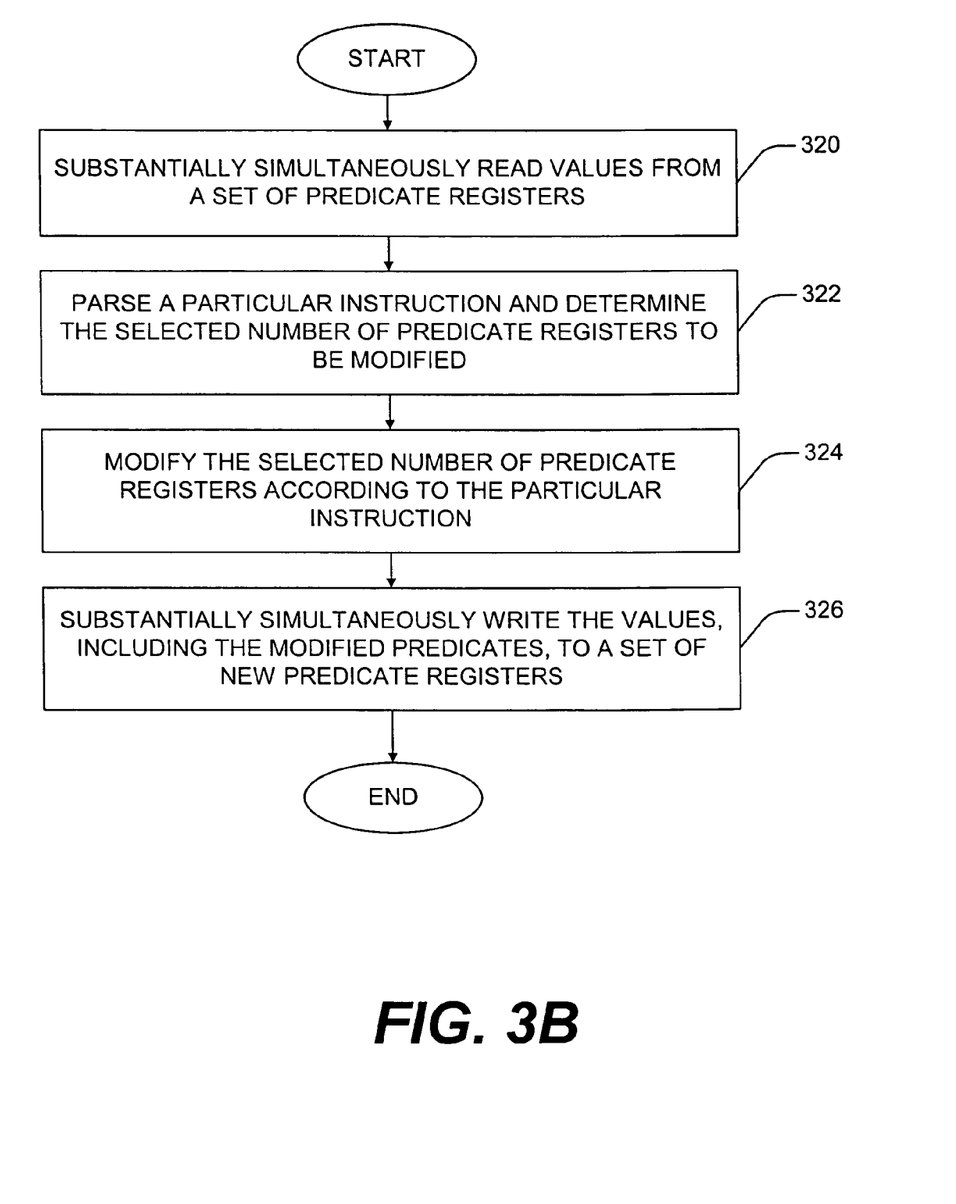

A method for processing of registers in an out-of-order processor in accordance with an embodiment of the present invention is shown in FIGS. 3A and 3B. The method also includes a technique for computing and providing architecturally correct values for the registers. In the illustrated embodiment, the process of providing architecturally correct values is implemented as read-modify-write operations to solve a "partial writes" problem in the context of predicate registers. This method enables the predicate registers to be accessed both individually as 1-bit registers, and collectively as a single 64-bit register. Moreover, this method may be implemented in the context of other registers, such as NaT registers.

The register processing method (FIG. 3A) includes providing a prediction for a predicate in an instruction, at 300. As mentioned above, the prediction may be based on past history of the predicate. A first set of values for selected predicate registers in a predicate register file is set according to the prediction, at 302. A second set of values, which represents architecturally determined values for the predicate, is obtained at 304. The architecturally correct values are computed using the read-modify-write operation illustrated in FIG. 3B. Hence, the first set of values represents predicted values, while the second set of values represents architecturally correct values. At 306, the first set of values is then compared to the second set of values. The speculative predicate register is updated to match the architectural predicate register, at 310. The instruction containing the incorrectly predicted predicate, and any dependent instructions are then flushed from the pipeline (at 310) if the comparison (at 308) indicates that the first set of values is not equal to the second set of values.

The read-modify-write operation (specified in FIG. 3B) includes substantially simultaneously reading values from all predicate registers in a predicate register file, at 320. In the Itanium architecture, this may involve reading the values of all 64 predicate registers in the predicate register file substantially simultaneously. Next, the instruction is parsed, and a select number of predicate registers to be modified is determined, at 322. The selected number of predicate registers is then modified, at 324. The number of predicate registers to be modified is determined by the instruction. Hence, the value(s) of 1, 2, 48, or up to 63 predicate registers are modified depending on the instruction, as listed in Table 2. Note that the instruction that writes to all 63 bits of the predicate register may omit the read portion of the read-modify-write since all 63 bits are being modified. Note that in the Itanium Architecture, predicate register 0 is always true. The values, including the modified predicates, are then substantially simultaneously written, at 326, to a set of new predicate registers. Therefore, in the above example of FIG. 1, all 64 values are written to the predicate register file substantially simultaneously. In an alternative embodiment, a means by which the entire set of values may be collectively read or collectively written by instructions that operate on the entire set of values without the need for a read-modify-write operation is provided.

Figure 4:
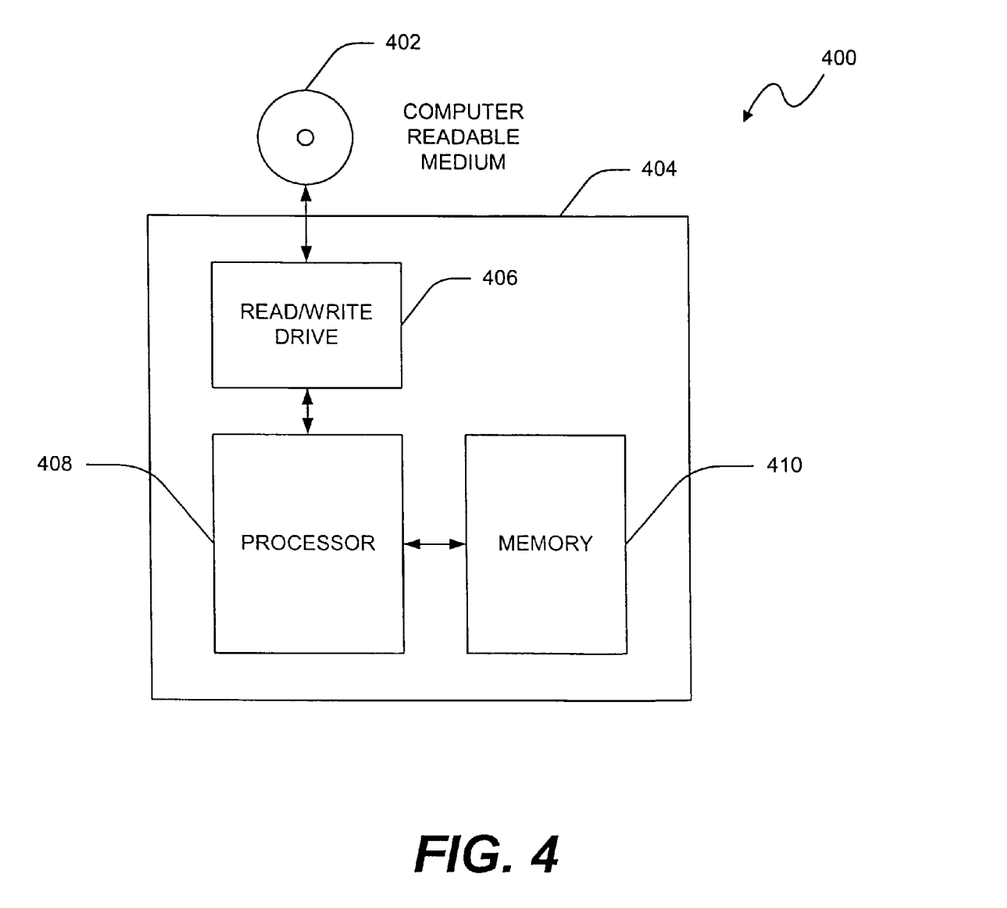
FIG. 4 is a block diagram of a processor-based system which may execute codes residing on the computer readable medium.

FIG. 4 is a block diagram of a processor-based system 400 which may execute codes residing on the computer readable medium 402. The codes are related to the method for processing registers in an out-of-order processor described in FIGS. 1 through 3B. In one embodiment, the computer readable medium 402 may be a fixed medium such as read-only memory (ROM) or a hard disk. In another embodiment, the medium 402 may be a removable medium such a floppy disk or a compact disk (CD). A read/write drive 406 in the computer 404 reads the code on the computer readable medium 402. The code is then executed in the processor 408. The processor 408 may access the computer memory 410 to store or retrieve data.

Advantages of above-described technique and method include an ability to process the predicate registers as a single 64-bit register rather than as 64 one-bit registers. This simplifies the out-of-order "renamer" since it only needs to deal with one 64-bit predicate register. Furthermore, the register processing may be made easier since the parallel compares are processed substantially similarly to read-modify-write operations. However, processing the predicate register file as a single 64-bit register in read-modify-write operations turns predicate producing instructions into both predicate consuming and predicate producing instructions. This transformation serializes the execution of the instruction, and permits only one compare per clock cycle.

TABLE 3

| | |
|---|---|
| O31 | cmp.eq p1, p2 = r10, r11 |
| O32 | cmp.eq p3, p4 = r12, r13 |

For example, two independent compare instructions O31, O32, shown above in Table 3, must be executed sequentially because the compare instruction O31 not only writes to predicates p1 and p2 but all 64 predicates of the predicate register file, including the predicates p3 and p4. Thus, the instruction O32, which reads and modifies predicates p3 and p4, must wait for the completion of the instruction O31. Accordingly, to process more than one compare per clock cycle, a fusing mechanism may be employed. This fusing mechanism is further described in a related U.S. patent application Ser. No. 10/335,201, filed by inventors Grochowski et al., entitled "Fuser renamer apparatus, systems, and method".

As was mentioned above, the processing of registers in a dynamically scheduled (e.g., out-of-order) processor may include registers other than predicate registers. For example, a similar situation exists, in the Itanium architecture, with the User Not-a-thing (UNaT) and Register Stack Engine NaT (RNaT) registers. These 64-bit registers are written and read one bit at a time by the store.spill and load.fill instructions, respectively. The registers may also be written and read 64 bits at a time by the 'mov-to/from-AR' instruction.

Accordingly, the same read-modify-write technique and method described above may be applied to implement the single-bit write in the store.spill instruction. Store spill may read the entire 64-bit UNaT or RNaT register as a source operand, modify one bit, and write the entire 64-bit register, thus avoiding partial writes problem. Again, the effect of the read-modify-write operation is to serialize the execution of store.spill instructions in an out-of-order processor and to preserve proper instruction semantics.

There has been disclosed herein embodiments for effectively configuring the maintenance of values for the predicate register file. Specifically, the present embodiments provide techniques for verifying the validity of predicate prediction and maintaining architecturally correct predicates in the predicate register file. By processing the predicate register file as a single multi-bit register rather than as a plurality of one-bit registers, the present embodiments transform the "partial writes" problem into read-modify-write operations. This simplifies the register processing in an out-of-order processor while enabling the predicate registers to be accessed both individually as 1-bit registers, and collectively as a single 64-bit register.

While specific embodiments of the invention have been illustrated and described, such descriptions have been for purposes of illustration only and not by way of limitation. Accordingly, throughout this detailed description, for the purposes of explanation, numerous specific details were set forth in order to provide a thorough understanding of the present invention. It will be apparent, however, to one skilled in the art that the system and method may be practiced without some of these specific details. For example, although the registers are described in terms of having 64 predicate or NaT registers, a different number of registers may be used to perform similar functions. In other instances, well-known structures and functions were not described in elaborate detail in order to avoid obscuring the subject matter of the present invention. Accordingly, the scope and spirit of the invention should be judged in terms of the claims which follow.

What is claimed is:

1. A method, comprising:
providing a prediction for a predicate in an instruction in an instruction pipeline of an out-of-order processor;
setting a first set of values for selected predicate registers in a predicate register file according to the prediction, wherein the first set of values includes predicted values for the predicate;
obtaining a second set of values which represents architecturally determined values for the predicate, the second set of values being computed by a read-modify-write operation, wherein the second set of values includes architecturally correct values for the predicate, and wherein performing the read-modify-write operation comprises:
substantially simultaneously reading all values from all the predicate registers in the predicate register file, including the first set of values for the selected predicate registers;
modifying the first set of values in the selected predicate registers; and
substantially simultaneously writing the values to a set of new predicate registers in the predicate register file, including the second set of values; comparing the first set of values with the second set of values; and
flushing the instruction with incorrectly predicted predicate and any dependent instructions from the instruction pipeline if the first set of values is different from the second set of values.

2. The method of claim 1, wherein said performing the read-modify-write operation includes: parsing the instruction, and determining the selected predicate registers to be modified.

3. The method of claim 1, wherein said providing the prediction for the predicate includes providing a prediction based on history of the predicate.

4. The method of claim 1, wherein said setting the first set of values includes setting 1, 2, 48, or up to 63 values depending on the instruction.

5. The method of claim 4, wherein the instruction is an Itanium instruction.

6. The method of claim 1, further comprising: collectively reading or collectively writing an entire set of values by instructions that operate on the entire set of values without a need for the read-modify-write operation.

7. A computer readable medium containing executable instructions which, when executed in a processing system, causes the system to process registers in an out-of-order processor, comprising:

providing a prediction for a predicate in an instruction in an instruction pipeline of the out-of-order processor;

setting a first set of values for selected predicate registers in a predicate register file according to the prediction;

obtaining a second set of values which represents architecturally determined values for the predicate, the second set of values being computed by a read-modify-write operation, wherein performing the read-modify-write operation comprises:

substantially simultaneously reading all values from all the predicate registers in the predicate register file, including the first set of values for the selected predicate registers;

modifying the first set of values in the selected predicate registers; and substantially simultaneously writing the values to a set of new predicate registers in the predicate register file, including the second set of values;

comparing the first set of values with the second set of values; and flushing the instruction with an incorrectly predicated predicate and any dependent instructions from the instruction pipeline if the first set of values is different from the second set of values.

8. The medium of claim 7, wherein said providing the prediction for the predicate includes providing a prediction based on history of the predicate.

9. The medium of claim 7, wherein the first set of values includes predicted values for the predicate.

10. The medium of claim 7, wherein the second set of values includes architecturally correct values for the predicate.

* * * * *